Patented Mar. 25, 1941

2,235,950

UNITED STATES PATENT OFFICE 2,235,950

TREATMENT OF PLANT ROOTS

Howard K. St. John, Oklahoma City, Okla.

No Drawing. Application February 6, 1940,
Serial No. 317,589

2 Claims. (Cl. 47—58)

The present invention relates to improvements in the treatment of plant roots, such as annual or perennial grasses, by means of which said roots are invigorated or vitalized and also prepared and sustained in such condition for shipment or storage over long periods of time preliminary to planting.

More particularly, my method is herein disclosed as applied to African Bermuda grass (*Cynodon transvaalsis*), a type of grass possessing the habit of creeping and rooting at the nodes, producing numerous slender or stout creeping root stocks. This Bermuda grass is adapted to the warmer portions of the Western Hemisphere, such as the Southern States of the United States, and although little known in this locality, it is rapidly becoming used as a lawn grass or may be used as pasture, and this process will be particularly described in reference thereto.

I desire it to be understood, however, that this method may be applied to other similar grasses, such, for examples, as Bent grass and the like, and therefore, I do not wish to be limited as regards the particular plant to be treated, except as provided in the appended claims.

Heretofore it has been customary in shipping African Bermuda grass to take up the sod in squares approximately one foot in diameter and about two inches in thickness, leaving the soil intact with roots and runners; and packing such units in burlap bags without any treating medium or other packing ingredient.

Upon receipt of the shipment, the purchaser cuts up each square in a large number of pieces and plants said pieces in rows twelve inches apart, each piece spaced about twelve inches apart in the row.

The shipment of the sod in the above manner is very unsatisfactory, especially over long distances, not only because of its bulk and excess weight due to the soil being left intact, but because of the heating or burning of the roots and runners due to the heating effect of the green top growth. Another disadvantage of this form of shipping arises from the fact that the seed houses cannot keep it in storage in this form, and so are not interested in selling it.

For the foregoing reasons, and to overcome the various problems stated, I conceived of the special method of handling and treating the grass roots as hereinafter more specifically pointed out.

It is well known that Bermuda grass spreads by means of runners on top of the ground, and by roots under the ground, and that in about six to eight weeks the runners and roots of the spaced plantings meet, thereby establishing the lawn or pasture.

The main roots and runners of this grass are composed of numerous joints, and as these joints throw out new roots and runners, they in turn also spread until a dense carpet-like mat is formed.

In the procedure involving my process, all of the top growth is mowed off, and the roots and runners are then taken up and freed from all soil, preferably with water. This removal of the top growth to retard burning of the roots and moulding thereof is in itself novel in the treatment of African Bermuda grass and the like, preparatory to shipping, storage, or planting thereof.

After the roots and runners are washed clean, they are cut into short lengths of approximately one inch. This length may vary one-half inch either way. The next step is the immersion of these clippings in a solution consisting of one part vitamin B-1 pure crystalline powder (thiamine hydrochloride), to one million parts of water. I have found in practice that the period of immersion of approximately fifteen minutes is sufficient for my purposes, but this period is not critical and may therefore greatly vary above and below that length of time, dependent upon the particular condition of the roots. The purpose of this treatment is to thoroughly impregnate the clippings of roots and runners with the vitamin B-1 solution so as to reinvigorate them and keep them practically free from root shock during transit and storage. I use this solution primarily for the stimulating effect on the roots.

The foregoing treatment reinvigorates the roots for planting purposes, but if they are to be packaged and shipped, the roots are further treated by way of preparation to this end, so that the chemical activity of the treating solution may be maintained over the necessarily prolonged period before planting. Thus, after removing the clippings from the vitamin B-1 solution and while they are still wet, they are mixed with dry peat moss, of horticultural grade or finer, the proportions being approximately one pound of clipped roots and runners to one-half pound of peat moss. The reason for having the moss dry at this time is because it mixes much better and adheres thoroughly to the small fibrous wet roots. After the clippings of roots and runners are thoroughly mixed with the peat moss, the mixture is sprinkled with the vitamin B-1 solution until it is thoroughly saturated. The purpose of this damp treated peat moss is to act as a carrier, and, at the same time, keep the thiamine hydrochloride active during transportation or storage, as the chemical is not active without moisture. After the mixture is allowed to drain off all surplus solution it is packed in moisture-resisting perforated paper-lined jute or cloth bags, and is ready for shipment. My experiments have proved that the clippings of roots and runners will keep by this process in a vigorous and growing condition for a period of twenty to thirty days, depending on weather conditions. This process enables me to distribute a merchantable product.

In the planting of the roots thus treated, I contemplate that the carrier shall be distributed with the roots at the time of planting, so that later when the soil is wet down a certain amount of the chemical will become active which will be sufficient to give the roots a good start.

Now I consider the cutting up of the roots and runners of great importance in my process. As I explained previously, the main roots and runners of the grass consist of numerous small joints which carry small fibrous roots, or will soon produce fibrous roots if kept in a growing or vitalized condition. For example, one single main root or runner six inches long may have as many as twelve joints.

Instead of planting this runner or root as one single unit, my process provides for cutting it up into approximately twelve separate units, and as each one of these separate units or joints will produce a start of new runners and roots, both fibrous and main, in a short time, it can readily be seen how much the coverage qualities of my product have been increased. In other words, a given pound of roots and runners planted under the usual method would only effectually plant approximately fifty square feet of lawn; but with my process of cutting up the roots and runners, and keeping them vitalized during transit and storage, a pound of roots and runners will even more effectually plant two hundred square feet of lawn, which would cover more quickly and give a more uniform coverage.

A bag containing five pounds of my processed roots and runners mixed with the treated peat moss would weigh approximately twelve pounds, and this will plant one thousand square feet of lawn, whereas to ship enough roots and runners under the usual method to plant one thousand square feet of lawn, it would be necessary to ship two large bags weighing a total of approximately 140 pounds, and it could not be shipped over long distances, or kept in storage satisfactorily.

It may be noted that for reasons given herein, the seed of this grass is not available in the United States so far as I am aware, but as there is a demand for the grass throughout the Southern States, my object has been to perfect a process whereby my grass could be economically and safely shipped, kept in storage for a period of several days without any appreciable loss of vitality, and received by the purchaser in a vigorous condition to facilitate the planting and give to the purchaser a method whereby his lawn can be economically planted.

In the foregoing description, I have referred to the treatment of roots, but I desire it to be understood that this includes not only the roots themselves but the root stocks or stolons, and in the appended claims the term "root" is intended to thus include the various parts of the root system of the plant.

What I claim as new and desire to secure by Letters Patent is:

1. The method of treating plant roots of the type described, which comprises removing the earth therefrom, cutting said roots into a plurality of pieces, immersing said pieces for a predetermined time in a solution containing a vitalizing medium, removing said pieces from the solution, applying to said treated roots a carrying substance saturated with said vitalizing solution for sustaining said roots against root shock during transit and storage and until planted.

2. The method of treating plant roots which comprises removing all adhering earth therefrom, immersing said roots in a vitamin B-1 solution, until impregnated therewith, removing the roots from the solution, and, while wet, mixing said roots with peat moss to absorb excess moisture therefrom and cause said moss to adhere to the roots, and saturating the mixture of roots and peat moss with the vitamin B-1 solution.

HOWARD K. ST. JOHN.